Feb. 27, 1951     R. H. HILL     2,543,170
METHOD OF TRANSPORTING CARBON DIOXIDE AND LIKE SUBSTANCES
Filed June 12, 1944
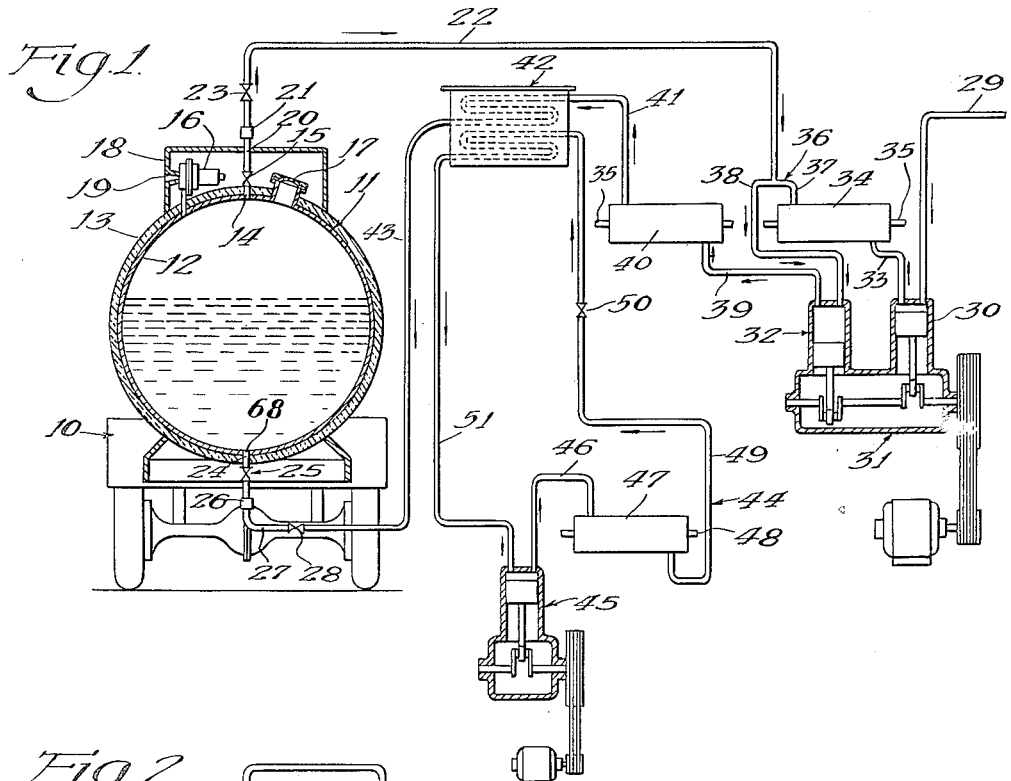
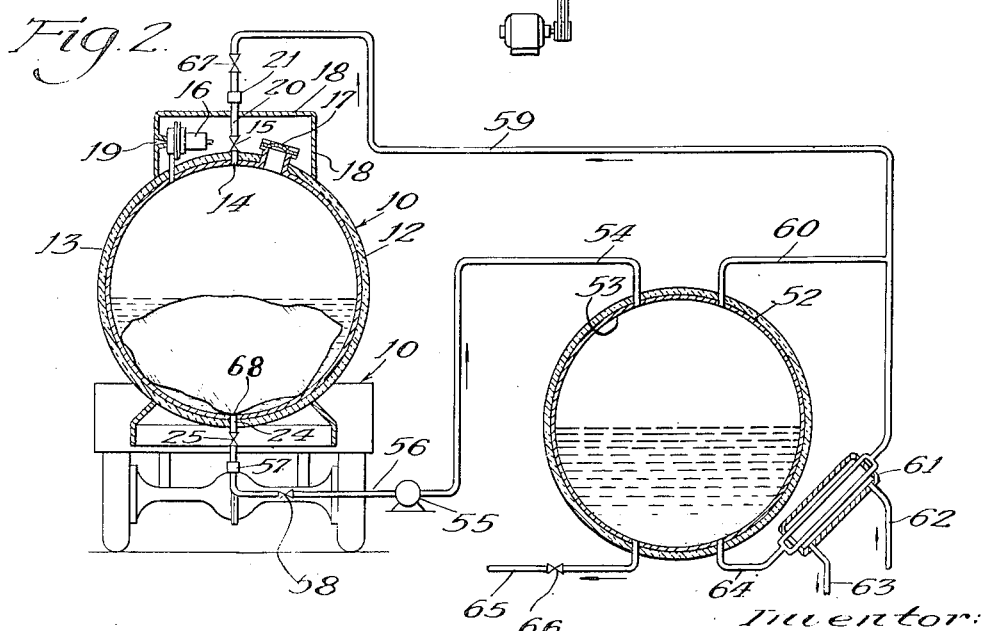
Inventor:
Robert H. Hill
By: Wallace and Cannon
Attorneys Patented Feb. 27, 1951

2,543,170

UNITED STATES PATENT OFFICE 2,543,170

METHOD OF TRANSPORTING CARBON DIOXIDE AND LIKE SUBSTANCES

Robert H. Hill, Elgin, Ill., assignor to The Marison Company, Elgin, Ill., a corporation of Illinois Application June 12, 1944, Serial No. 539,968

5 Claims. (Cl. 62—1)

This invention relates to a method of transporting substances such as, for example, $CO_2$, air, sulphur dioxide, nitrous oxide, and oxygen which exist in gaseous form at atmospheric temperatures and pressures.

Heretofore it has been customary to transport such normally gaseous substances under high pressures and in heavy steel containers. However, one serious objection to this method has been that these steel containers are relatively very heavy compared to the weight of the compressed gas transported therein and must be transported or returned empty to the source of the gas after use. Thus, for example, a steel cylinder weighing approximately 100 lbs. will hold only about 50 lbs. of $CO_2$, or about the same weight of nitrous oxide, and only about 18 lbs. of oxygen, under the permissible pressures to which such cylinders must be confined by governmental regulations in order to minimize the hazards or risks of explosion. Hence the size of such cylinders and the amount or weight of gas which may be transported therein is limited. Thus, for example, the maximum weight of $CO_2$ which may be transported in a large and so-called ICC3A steel cylinder is 150 lbs. and then only in special cases.

Various attempts have been made heretofore to overcome the objectionable features of the prior art practice of transporting $CO_2$ and other gases under high pressures in steel cylinders and one such other method has been to liquefy the gas and to transport it in liquid condition in a refrigerated and insulated automotive vehicle truck, trailer or the like. In the practice of this method the gas is maintained at a low temperature to increase its density and to reduce its vapor pressure and thus minimize the risk and hazards of explosion. Likewise, in the practice of this method the insulated gas container is refrigerated by vaporizing a portion of the liquefied gas in the container and liberating the vaporized gas to the atmosphere. This method has been extensively used in the commercial transportation of certain gases, and particularly $CO_2$, but it is subject to certain limitations and objectionable features. Among these is the fact that such refrigerated and insulated automotive vehicle containers require very heavy construction and in transporting the gas to considerable distances a relatively large amount of the contained gas is lost in refrigerating the balance. Thus, for example, in a typical insulated and refrigerated automotive vehicle truck container, of the character referred to above, for every 120 B. t. u. of heat which leaks through the wall of the insulated tank or container one pound of $CO_2$ is lost.

Moreover, a further objectionable feature of insulated and refrigerated containers of this character is the fact that by reason of the insulation and appliances embodied therein they are necessarily made an integral part of a railway car or automotive vehicle truck or trailer so that after delivery of the liquefied gas hauled therein they must be returned in empty condition to the source of the gas as they are especially adapted to haul liquefied gas and are not suitable for any other use.

Another well-known method which has been employed extensively in transporting $CO_2$ is to freeze the gas into solid form which is known commercially as "Dry Ice." While this method is free from the above-mentioned objectionable features involved in transporting $CO_2$ in liquid form by means of automotive vehicle truck or railway car containers it has, nevertheless, objectionable features and among these are, (a) the refrigeration necessary to keep Dry Ice at its low temperature (about $-109°$ F.) comes from vaporization of a portion of the solidified gas and this results in substantial loss of gas, particularly when the material is transported over long distances; (b) there is some loss of the $CO_2$ in cutting it into blocks and there is also some further loss in loading the solidified gas into the convertors by means of which it is reconverted back into usable form; (c) this method necessitates the wrapping and packaging of the solidified $CO_2$, handling it in transportation, unwrapping it at the point of delivery, and then loading it into the convertor; and (d) frost tends to form on the solidified $CO_2$ during transportation, atmospheric gases tend to condense on the solidified $CO_2$ both during transportation and handling, due to the low temperature of the solidified $CO_2$, the wrapping papers tend to adhere to the solidified gas, and foreign particles, such as dust and dirt, frequently accumulate on and to contaminate solidified $CO_2$.

The present invention has as its primary object the provision of a novel and efficient method and apparatus for transporting substances, such as those described above, and which are normally gases at atmospheric temperatures and pressures, and which method overcomes the foregoing and other objectionable features of the prior art methods of transporting such substances hereinbefore referred to.

Another object of the present invention is to afford a novel, simple, efficient and economical method of an apparatus for transporting $CO_2$ or analogous normally gaseous substances.

A further object of the invention is to afford a novel method of and apparatus for unloading $CO_2$ or analogous gases from an insulated carrier container.

Other and further objects of the present invention will be apparent from the following description and claims and are illustrated in the accompanying drawings which, by way of illustration, show a preferred apparatus which may be employed in the practice of the present invention, and the principles thereof, and what I now consider to be the best mode in which I have contemplated applying the principles of the present invention. Other embodiments of the invention embodying the same or equivalent principles may be used and structural changes may be made in the form of the apparatus shown in the drawing, as desired, by those skilled in the art without departing from the present invention and the purview of the appended claims.

Fig. 1 is a schematic illustration, partly in section, of a typical apparatus, including an automotive vehicle truck or carrier container which may be employed in transporting $CO_2$ or like gases in the practice of the present invention, and in loading the gas into the carrier or transport container, at the source, for transportation; and Fig. 2 is a schematic illustration of a typical apparatus which may be employed in unloading the automotive vehicle transport or carrier container at the point of delivery.

A typical and suitable apparatus which may be employed in the practice of the present invention is illustrated in the drawings and comprises an automotive vehicle truck or trailer, which is generally indicated at 10, and upon which there is mounted, in any suitable manner, an insulated cylindrical carrier or transportable container, which is generally indicated at 11, and which comprises an inner steel shell 12 which is provided with an outer layer of suitable heat-insulating material 13.

The upper wall of the inner steel shell 12 of the carrier or transport container 10 is provided with an inlet opening 14 in which is arranged a vapor outlet control valve 15 which may be of a suitable and conventional design. Likewise, the upper wall of the inner steel shell 12 of the container 10 is shown as being provided with a primary safety device in the form of a bleed valve 16 and with an auxiliary or secondary safety device in the form of a rupturable disc 17, both of which safety devices may be of conventional design. The parts thus far referred to are shown as being enclosed in a housing or cap 18, which is mounted on the upper wall of the container 10, and which is provided with an outlet opening 19 which is shown as having direct communication with the primary safety device or bleed valve 16.

The vapor outlet control valve 15 is provided with a vapor outlet pipe 20 which projects above the upper wall of the housing or cap 18 and one side of a conventional separable coupling 21 is attached to this vapor outlet pipe 20, the other side of the conventional coupling 21 being detachably connected to an outlet pipe or line 22 in which a manually operable control valve 23 is arranged.

Similarly, the bottom wall of the inner steel shell 12 of the container 10 is provided with a combination liquid inlet and outlet opening 68 to which a combination liquid inlet and outlet line or pipe 24 is connected. A suitable manually operable control valve 25 of conventional design is arranged in the combination liquid inlet and outlet pipe 24 and one end of this pipe 24 is attached to one side of a conventional separable coupling 26. The other side of the conventional coupling 26 is detachably connected to a combination liquid inlet and outlet pipe or line 27 to which a manually operable control valve 28 is connected.

The container loading or filling apparatus shown in Fig. 1 comprises a supply line 29 which may be associated with and connected to any suitable source of $CO_2$ or other gases of the character hereinbefore indicated. The supply line 29 is connected to the inlet side of a low pressure or so-called first stage compressor unit 30 of a motor-driven compressor mechanism, which is generally indicated at 31, and which includes a so-called second stage or high compression unit 32, the first stage or low compression unit 30 being adapted to compress the gas to a relatively low pressure of, for example, 55 lbs. per square inch and the entire compressor unit being adapted to compress the gas to a relatively high pressure such, for example, as 300 lbs. per square inch.

The outlet side of the low pressure unit 30 is connected by a line 33, to one end of a heat exchanger 34 through which cold water or other cooling fluid may be run, by way of a pipe 35. The opposite end of the heat exchanger 34 is provided with a T-connection 36 the stem or trunk of which is provided by the line 22. One arm 37 of the T-connection 36 leads from the line 22 into the heat exchanger 34 and the other arm 38 of the T-connection 36 leads into the inlet side of the second stage or high compression unit 32 of the compressor 31. The outlet side of the second stage or high compression unit 32 of the compressor 31 is connected by a line 39 to the inlet side of a heat exchanger 40 through which cold water or the cooling fluid may be run by way of the pipe 35. The outlet side of the heat exchanger 40 is connected by a line 41 to the inlet side of a condenser unit 42 and the outlet side of the condenser unit 42 is connected by a line 43 to the manually operable control valve 28 (Fig. 1).

A suitable cooling unit or apparatus, generally indicated at 44, is provided for use in conjunction with the condenser 42, and this cooling unit 44 may be of any suitable design and intended for use with ammonia, $CO_2$ or other coolant. The cooling unit or apparatus 44 is shown as comprising a motor-driven refrigerating compressor unit 45 the outlet side of which is connected by a line 46 to the inlet side of a heat-exchanger 47 through which a suitable cooling fluid may be run by way of a pipe 48. The outlet side of the heat exchanger 47 is connected by a line 49 to the inlet side of the condenser unit 42, a suitable expansion valve 50 being arranged in the line 49. The outlet side of the condenser unit 42 is connected by a line 51 to the inlet side of the refrigerating compressor unit 45.

In the practice of the present invention the filling apparatus shown in Fig. 1 may be located at or in conjunction with a supply line 29 or source $CO_2$ or other gas which, in the case of $CO_2$ may be, for example, a brewery or other place. The automotive vehicle truck or trailer 10 and attached carrier or transport container 11 may be run up to the filling apparatus and connected thereto by the couplings 21 and 26 whereupon the manually operable control valves 25 and 28 may be opened. The two stage compressor unit 31 and the refrigerating compression unit 45 may then be set in operation, together with their associated heat exchange units 35—40 and 47, respectively.

The $CO_2$ or like gas will then flow from the inlet or supply source 29 into the inlet side of the first stage or low pressure unit of the two-stage compressor 31 wherein it may be compressed to a relatively low pressure such, for example, as 55 lbs. per square inch. The thus partially compressed gas will then flow from the outlet side of the low pressure unit 30 by way of the line 33 into the inlet side of the heat exchanger 34, through the latter, thence by way of the line 36—37—38 into the inlet side of the second stage or high compression unit 32 of the compressor 31 wherein it will be further compressed to a relatively high pressure such, for example, as 300 lbs. per square inch. The thus compressed gas will then flow out of the outlet side of the second stage or high compression unit 32 of the compressor 31 by way of the line 39 into the inlet side of the heat exchanger 40, through the latter, thence by way of the line 41 into and through the condenser 42, in which the highly compressed gas will be condensed to a liquid. The thus liquefied gas will then flow by way of the line 43, the then opened manually operable control valve 28, pipe 27, coupling 26, the then opened manually operable control valve 25, and inlet 24—68 into the bottom or lower area of the insulated vehicular container 11—12—13 at a controlled temperature and pressure, that is to say, at a temperature which is preferably near but slightly above triple point temperature and at a pressure which is preferably near but slightly above the triple point pressure of the particular liquefied gas.

During the above described compressing and condensing operations the cooling or refrigerating unit 44—45—46—47—48—49—50—51 for the condenser 42 will operate in conjunction with the condenser unit 42 in a conventional manner well understood in the art and which need not, therefore, be described in detail herein.

During the first part of the operation of filling the vehicular transport or carrier container 11—12—13 the manually operable control valves 15 and 23 are allowed to remain closed. However, after the liquefied $CO_2$ or other liquefied gas reaches a predetermined height or level in the container 11 the valves 15 and 23 are opened and some of the $CO_2$ or other vapor above the liquid level in the container 11 is continually drawn off from the upper area of the container 11, during the remainder of the filling operation, by way of the outlet 14, valve 15, coupling 21, valve 23, and line 22—36—38 into the inlet side of the second stage or high compression unit 32 of the compressor 31 wherein it is recompressed and passed back through the parts 39—40—41 to the condenser 42 wherein it is liquefied and then returned as liquid by way of the line 43—26—25—24—68 to the lower area of the transport or carrier container 11. In this manner the vapor withdrawn from the upper area of the container during the filling operation is conserved and loss thereof avoided and efficient and economical operation of the method and system assured.

The rate of withdrawal of the $CO_2$ or like vapor thus withdrawn from the upper area of the transport or carrier container 11 may be controlled so as to reduce the vapor pressure in the container to, and so as to maintain said vapor pressure at, the triple point pressure of the liquefied gas. This induces further vaporization of the liquid in the container 11 and the necessary heat of vaporization thus required is withdrawn from the liquefied gas in the container and thus reduces the temperature of the liquid in the container 11 to a point somewhat below its so-called triple point temperature. This disturbs the equilibrium of the system and causes the major portion or all of the liquid in the container 11 to freeze or solidify.

It will be understood, in this connection, that the triple point of the material is the point of temperature and pressure at which the three phases of the material, namely, solid, liquid and vapor, will all exist in equilibrium. In the case of $CO_2$ the triple point temperature is approximately $-79°$ C. and the triple point pressure is a pressure of about 5.1 atmospheres or about 76.5 lbs. per square inch.

In this way all or the major portion of the liquefied gas in the container may be frozen to solid form, as desired.

The main compressor 31 and the refrigerating compressor 45 for the condenser 42, and the heat exchangers 34—40 and 47, respectively associated therewith may then be shut down, the manually operable control valves 15—23 and 25—28 closed, and the couplings 21 and 26 disconnected, whereupon the vehicular transport or carrier container 10—11—12—13 may be transported with its load of solidified $CO_2$, or other solidified gas, with or without some liquefied gas, as desired, to the point of delivery at which it is shown in Fig. 2, and where the solid or solid and liquid content of the transport container 11 may be unloaded by the unloading apparatus shown in Fig. 2, and which will now be described.

The unloading apparatus which is schematically illustrated in Fig. 2 comprises a steel storage container 52 which is preferably provided with a layer of heat insulation 53. The storage container 52 has an inlet line 54 which opens into the upper wall thereof and this inlet line 54 is connected to the outlet side of a conventional motor-driven pump, which is generally indicated at 55. A line 56 leads from the inlet side of the pump 55 and this line 56 is adapted to be detachably connected, by a coupling 57, to the liquid inlet-outlet line 68—24—25 at the bottom of the transport container 10, a suitable manually operable control valve 58 being arranged in the line 56.

A pipe 60 leads from the upper area of the storage tank 52 and this pipe 60 is connected, by way of a line 59, to the separable coupling 21 which is arranged at the top of the transport container 10, a manually operable control valve 67 being arranged in the line 59 immediately above the transport container 10. The line 59 is connected, by way of an extension 64, to the lower area of the storage container 52. A heat exchanger 61 is mounted in conjunction with the line 59 and one end of the heat exchanger 61 is connected to a suitable source of heat, such as a steam pipe 62, the other end of the heat exchanger being provided with an outlet 63.

The lower area of the storage container 52 is provided with an outlet pipe 65 in which a manually operable control valve 66 is arranged, whereby the liquid contents of the storage container 52 may be run into any suitable receptacles for the liquefied gas stored in the storage container 52.

In the practice of the present invention, when the transport container 10 arrives at the point of delivery, adjacent the storage container 52 shown in Fig. 2, the inlet 20 of the transport container 10 is connected to the line 59 by means of the coupling 21 and the outlet 24 of the transport container 10 is connected to the line 56 by means of the coupling 57. The manually operable control valves 15—67 and 25—58 may then be opened (the outlet control valve 66 being closed), and the pump 55 and heat exchanger 61 may be set in operation, whereupon the unloading apparatus or system illustrated in Fig. 2 will operate substantially as follows: A certain amount of the liquefied gas in the storage container 52 will flow by gravity into the lower end portion of the line 64 in which it will be heated and vaporized by the steam or other heating medium entering the heat exchanger 61 by way of the line 62. The thus formed heated vapor will then flow, under its own vapor pressure, through the line 59, valve 67 and parts 21—20—15—14 into the upper area of the transport container 10 and into contact with the solidified $CO_2$ or other solidified gas in the transport container 10, thereby melting the same. The thus melted $CO_2$ or other analogous material will then be withdrawn and forced by the motor-driven pump 55, by way of the line 68—24—25—57—58—56—55—54, into the upper area of the storage container 52 from which it may be withdrawn by way of the outlet line 65—66 for use as desired.

After the unloading operation has been completed the valves 67—15 and 25—58 may be closed, and the operation of the pump 55 and heat exchanger 61 shut down, whereupon the transport container 10 may be disconnected from the unloading apparatus at the couplings 21 and 57.

While the unloading apparatus illustrated in Fig. 2 is shown as including a motor-driven pump 55 this pump may be eliminated, if desired, and the storage container 52 arranged at a level with respect to the transport container 10 to allow the latter to be unloaded entirely by gravity.

In the use of the unloading apparatus illustrated in Fig. 2, the liquid flowing into the storage container 52, by way of the line 54, tends to urge some of the vapor stored in the upper or vapor area of the storage container 52 out of the latter, by way of the line 60—59—67—21—20—15—14, into the upper area of the transport container 10, thereby tending to equalize the vapor pressures in the upper areas of the storage container 52 and the transport container 10.

The transport container 10 has been illustrated as having the specific form of an automotive vehicle truck or trailer container but it will be understood that it may also take the form of an insulated railway tank car container or it may take the form of a container which may be transported by automotive vehicle truck or trailer to and from a railway car for shipment in standard railway refrigerator cars.

While the invention has been described as being applied specifically to the transportation of $CO_2$ at a temperature somewhat below its triple point temperature, it will be understood that it is equally useful in the transportation of other normally gaseous substances, such as those hereinbefore referred to, at temperatures somewhat below their respective triple point temperatures.

It will be noted, in connection with the practice of the present invention, that the same provides a novel, simple and efficient method of transporting normally gaseous substances, such as $CO_2$ and the other gases referred to above, without substantial loss of gas in transit. This is indicated by the fact that in the case of $CO_2$, for example, the density of the solid $CO_2$ is about 1.28 times that of the density of liquid $CO_2$, under 300 lbs. per square inch pressure, thereby allowing transportation of a larger quantity of the material in less space, while, at the same time, enabling the use of a much lighter transport container since any $CO_2$ vapor or liquid which may exist at the triple point temperature of —79° C. has a vapor pressure of only about 5.1 atmospheres or about 76.5 lbs. per square inch. Thus the transport container 10 may be made relatively light in construction to enable it to withstand a pressure of only about 76.5 lbs. per square inch as compared to the relatively heavy transport or carrier containers heretofore used for transporting $CO_2$ in liquid form and which must be able to withstand a pressure of about 300 lbs. per square inch.

It will thus be seen from the foregoing description, considered in conjunction with the accompanying drawing, that the present invention affords a novel, simple and efficient apparatus and method for transporting $CO_2$ and other normally gaseous substances and thus accomplishes its intended objects and has the desirable advantages and characteristics including those hereinbefore pointed out and others which are inherent in the invention.

I claim:

1. A method of transporting substances which exist in gaseous form at atmospheric temperatures and pressures, said method comprising, in combination, the steps of compressing a gas into liquefied form, introducing the liquefied substance into an insulated transport or carrier container, reducing the temperature of the liquid phase of said substance in the transport or carrier container below the triple point temperature of the normally gaseous substance by withdrawing the vapor of said substance from the upper area of the container during the container-filling operation and prior to the transporting operation, returning the vapor thus withdrawn from the transport container to the compressing and condensing system, transporting the substance in the container in its solid phase to a point of delivery, liquefying the solid phase of the substance in the transport or carrier container at the point of delivery by introducing heated vapor of said substance into the transport container from a source extraneous to said transport container, and then removing all of the liquefied substance from the said transport or carrier container.

2. A method of transporting substances which exist in gaseous form at atmospheric temperatures and pressures, said method comprising, in combination, the steps of compressing a gaseous substance under high pressure, condensing the compressed gas into liquefied form, introducing the liquefied substance into an insulated transport or carrier container, reducing the temperature of the liquid phase of said substance in the transport or carrier container below the triple point temperature of the normally gaseous substance by withdrawing the vapor of said substance from the upper area of the container during the container-filling operation and prior to the transporting operation, returning the vapor thus withdrawn from the transport container to the compressing and condensing system, transporting the substance in the container in its solid phase to a point of delivery, withdrawing some of said substance, in its liquid form, from a storage container located at the point of delivery, heating the liquid thus withdrawn from the said storage container and converting it into the form of heated vapor, liquefying the solid phase of said substance in the transport or carrier container by introducing said heated vapor into said transport or carrier container, and then withdrawing the liquid contents of said transport or carrier container and delivering the same into said storage container.

3. In an apparatus of the character described, the combination of, an insulated carrier container adapted to carry or transport in its solid phase a substance which exists in its gaseous phase only at atmospheric temperatures and pressures, a storage container for storing said substance in its liquid form, means for withdrawing said substance in its liquid form from said storage container, means for heating said liquid substance withdrawn from said storage container to convert it into the form of the heated vapor of said substance, means for introducing said heated vapor into said carrier container so as to liquefy the solid phase of said substance therein, and means for withdrawing said substance in its liquid form from said carrier container and introducing it into said storage container.

4. A method of transporting $CO_2$ which comprises, in combination, the steps of compressing and condensing $CO_2$ in a compressor-condenser system located at a source of the gas, introducing the liquefied $CO_2$ into an insulated transport or carrier container, reducing the temperature of the liquid $CO_2$ in the carrier container below its triple point by withdrawing $CO_2$ vapor from the upper area of the carrier container after the liquid level of the liquefied $CO_2$ in the carrier container has reached a predetermined height during the operation of filling the carrier container, thereby freezing the liquid $CO_2$ into a solid, returning the $CO_2$ vapor thus withdrawn from the carrier container to the compressor-condenser system for subsequent return in its liquid phase to the carrier container, transporting the solid $CO_2$ in the carrier container to a point of delivery, liquefying the solid phase $CO_2$ in the carrier container at the point of delivery by introducing heated $CO_2$ in its vapor phase into the upper area of the carrier container, and then withdrawing the $CO_2$ content from the carrier container in its liquid phase at its point of delivery.

5. The method defined in claim 4 in which liquid $CO_2$ is withdrawn from a storage container at the point of delivery and heated to form heated $CO_2$ vapor and in which the heated $CO_2$ vapor is introduced into upper area of the carrier container to liquefy the solid phase $CO_2$ therein, and in which the thus liquified $CO_2$ in the carrier container is withdrawn therefrom and discharged into the storage container at the point of delivery.

ROBERT H. HILL.

REFERENCES CITED

The following references are of record in the file of this patent:

UNITED STATES PATENTS

| Number | Name | Date |
| --- | --- | --- |
| 1,659,431 | Josephson | Feb. 14, 1928 |
| 2,075,408 | Sholes | Mar. 30, 1937 |
| 2,117,819 | Okada | May 17, 1938 |
| 2,146,948 | Feykert et al. | Feb. 14, 1939 |
| 2,151,935 | Petroe | Mar. 28, 1939 |
| 2,180,231 | Geertz et al. | Nov. 14, 1939 |
| 2,296,349 | Hunt | Sept. 22, 1942 |
| 2,341,698 | Dennis | Feb. 15, 1944 |

FOREIGN PATENTS

| Number | Country | Date |
| --- | --- | --- |
| 136,481 | Switzerland | Jan. 16, 1930 |
| 412,814 | Great Britain | July 5, 1934 |
| 683,153 | Germany | Oct. 31, 1939 |